US012729825B2

(12) United States Patent
Menjo

(10) Patent No.: US 12,729,825 B2
(45) Date of Patent: Sep. 8, 2026

(54) ROAD SURFACE DRAWING LAMP AND ROAD SURFACE DRAWING LAMP SYSTEM

(71) Applicant: KOITO MANUFACTURING CO., LTD., Tokyo (JP)

(72) Inventor: Yosuke Menjo, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 18/710,063

(22) PCT Filed: Oct. 17, 2022

(86) PCT No.: PCT/JP2022/038544
§ 371 (c)(1),
(2) Date: May 14, 2024

(87) PCT Pub. No.: WO2023/085000
PCT Pub. Date: May 19, 2023

(65) Prior Publication Data
US 2025/0020304 A1 Jan. 16, 2025

(30) Foreign Application Priority Data
Nov. 15, 2021 (JP) ................................ 2021-185575

(51) Int. Cl.
*F21S 43/20* (2018.01)
*B60Q 1/38* (2006.01)
(Continued)

(52) U.S. Cl.
CPC ......... *F21S 43/26211* (2024.05); *F21S 43/14* (2018.01); *F21S 43/15* (2018.01);
(Continued)

(58) Field of Classification Search
CPC ............................ B60Q 2400/50; B60Q 1/381
See application file for complete search history.

(56) References Cited

U.S. PATENT DOCUMENTS 10,040,392 B2 * 8/2018 Salter ..................... B60Q 1/381
2005/0117364 A1 * 6/2005 Rennick ................ B60Q 9/008 362/540
(Continued)

FOREIGN PATENT DOCUMENTS

DE 10 2016 217 402 A1 3/2018
JP 2015-168290 A 9/2015
(Continued)

OTHER PUBLICATIONS

International Search Report (PCT/ISA/210) issued on Dec. 13, 2022 by the International Searching Authority in International Patent Application No. PCT/JP2022/038544.
(Continued)

*Primary Examiner* — Matthew J. Peerce
(74) *Attorney, Agent, or Firm* — Sughrue Mion, PLLC

(57) ABSTRACT

A road surface drawing lamp is configured to be mounted on a vehicle. The road surface drawing lamp is configured to draw a sequential light pattern in which an irradiation region changes in a sequential manner in a drawing region set in a surrounding region of the vehicle. The road surface drawing lamp is configured to first form, as the sequential light pattern, a first light pattern which is drawn at least in a part including a tip portion of the drawing region.

6 Claims, 11 Drawing Sheets

(51) Int. Cl.
*F21S 43/14* (2018.01)
*F21S 43/15* (2018.01)
*F21W 103/60* (2018.01)

(52) U.S. Cl.
CPC .......... *B60Q 1/381* (2022.05); *B60Q 2400/50* (2013.01); *F21W 2103/60* (2018.01)

(56) References Cited

U.S. PATENT DOCUMENTS

| | | | | |
|---|---|---|---|---|
| 2013/0010484 | A1* | 1/2013 | Son | B60Q 1/346<br>362/464 |
| 2013/0335212 | A1 | 12/2013 | Purks et al. | |
| 2017/0203685 | A1* | 7/2017 | Hirai | B60Q 1/0023 |
| 2018/0297511 | A1 | 10/2018 | Park et al. | |
| 2019/0322209 | A1* | 10/2019 | Sugiyama | F21S 43/26 |
| 2020/0070716 | A1 | 3/2020 | Sakata et al. | |
| 2020/0209385 | A1 | 7/2020 | Tezuka et al. | |
| 2021/0188159 | A1* | 6/2021 | Fukutaka | B60K 35/29 |
| 2021/0206312 | A1 | 7/2021 | Mochizuki et al. | |
| 2021/0347294 | A1 | 11/2021 | Mochizuki et al. | |
| 2022/0221123 | A1* | 7/2022 | Okubo | B60Q 1/247 |
| 2022/0371509 | A1 | 11/2022 | Okubo | |
| 2023/0331143 | A1 | 10/2023 | Mochizuki et al. | |

FOREIGN PATENT DOCUMENTS

| | | | |
|---|---|---|---|
| JP | 2016-193689 | A | 11/2016 |
| JP | 2020-55374 | A | 4/2020 |
| JP | 6879788 | B2 | 6/2021 |
| JP | 2021-111465 | A | 8/2021 |
| KR | 10 1908308 | B1 | 10/2018 |
| WO | 2020/067113 | A1 | 4/2020 |

OTHER PUBLICATIONS

Written Opinion (PCT/ISA/237) issued on Dec. 13, 2022 by the International Searching Authority in International Patent Application No. PCT/JP2022/038544.
Communication dated Dec. 9, 2024, issued by European Patent Office in European Patent Application No. 22892500.4.
Office Action dated Dec. 13, 2025 issued by the Korean Intellectual Property Office in Korean Patent Application No. 10-2024-7015797.

* cited by examiner

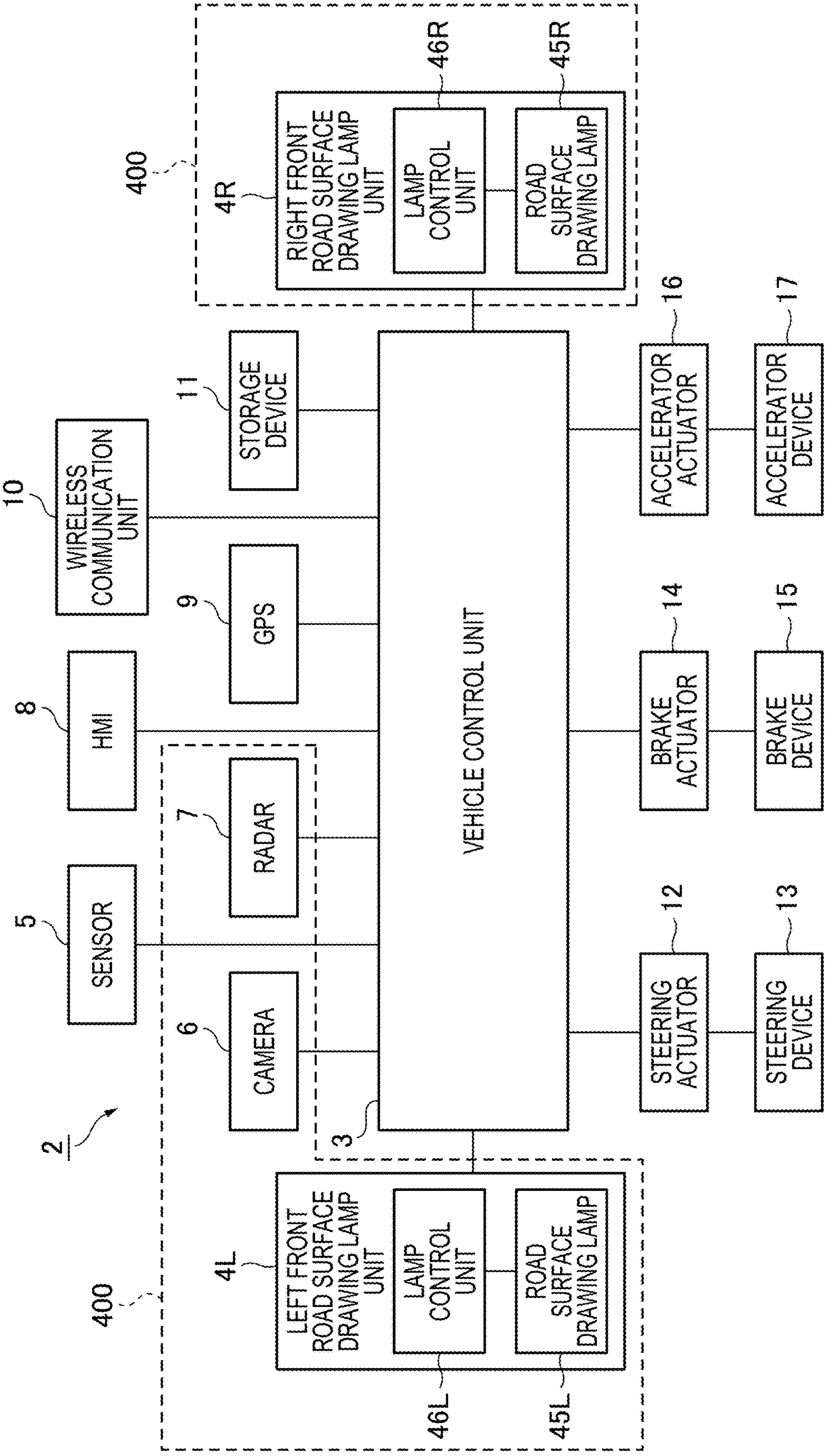

FIG. 2
2
400
5
SENSOR
8
HMI
10
WIRELESS COMMUNICATION UNIT
400
4L
LEFT FRONT ROAD SURFACE DRAWING LAMP UNIT
LAMP CONTROL UNIT
ROAD SURFACE DRAWING LAMP
46L
45L
6
CAMERA
7
RADAR
9
GPS
11
STORAGE DEVICE
3
VEHICLE CONTROL UNIT
4R
RIGHT FRONT ROAD SURFACE DRAWING LAMP UNIT
LAMP CONTROL UNIT
ROAD SURFACE DRAWING LAMP
46R
45R
STEERING ACTUATOR
12
BRAKE ACTUATOR
14
ACCELERATOR ACTUATOR
16
STEERING DEVICE
13
BRAKE DEVICE
15
ACCELERATOR DEVICE
17

ROAD SURFACE DRAWING LAMP AND ROAD SURFACE DRAWING LAMP SYSTEM

CROSS-REFERENCE TO RELATED APPLICATIONS

This application is a National Phase Entry of PCT International Application No. PCT/JP2022/038544 filed on Oct. 17, 2022, which claims priority to Japanese Patent Application No. 2021-185575 filed on Nov. 15, 2021.

TECHNICAL FIELD

The present disclosure relates to a road surface drawing lamp and a road surface drawing lamp system.

BACKGROUND ART

Patent Literature 1 discloses a vehicle lamp configured to draw a light pattern on a road surface around a vehicle in order to present information indicating a behavior of the vehicle (for example, information indicating left turn, right turn, or backward movement of the vehicle) to a pedestrian or the like present around the vehicle.

CITATION LIST

Patent Literature

Patent Literature 1: WO2020/067113A1

SUMMARY OF INVENTION

Technical Problem

The present inventor has focused on the fact that, for example, when a light pattern (referred to as a "sequential light pattern") in which an irradiation region changes in a sequential manner from a region closest to a vehicle (referred to as a "nearest region") toward a region farthest from the vehicle (referred to as a "farthest region") is drawn, a timing at which a traffic participant around the vehicle such as a pedestrian recognizes the sequential light pattern may be delayed.

An object of the present disclosure is to provide a road surface drawing lamp and a road surface drawing lamp system in which a traffic participant around a vehicle can recognize a sequential light pattern at an early stage.

Solution to Problem

A road surface drawing lamp according to an aspect for implementing the above object is a road surface drawing lamp configured to be mounted on a vehicle, in which: the road surface drawing lamp is configured to draw a sequential light pattern in which an irradiation region changes in a sequential manner in a drawing region set in a surrounding region of the vehicle; and the road surface drawing lamp is configured to first form, as the sequential light pattern, a first light pattern which is drawn at least in a part including a tip portion of the drawing region.

According to the above configuration, the road surface drawing lamp first forms, as the sequential light pattern, the first light pattern which is drawn at least in a part including the tip portion of the drawing region. That is, since the sequential light pattern to be drawn first is the first light pattern, the light pattern is first drawn at the tip portion of the drawing region. Therefore, according to the road surface drawing lamp having the above configuration, a traffic participant around the vehicle can recognize the sequential light pattern at an early stage.

A road surface drawing lamp system according to an aspect for implementing the above object including: the above road surface drawing lamp: a lamp control unit configured to control the road surface drawing lamp; and a detection unit configured to detect obstacle information on an obstacle that is present around the vehicle and limits a view angle of the vehicle, in which: the detection unit is configured to transmit the obstacle information to the lamp control unit in response to the obstacle being detected; and the lamp control unit is configured to control the road surface drawing lamp such that the sequential light pattern is drawn based on the obstacle information.

According to the above configuration, in response to the obstacle information on the obstacle that is present around the vehicle and limits the view angle of the vehicle being detected, the lamp control unit controls the road surface drawing lamp such that the sequential light pattern is drawn based on the obstacle information. In this manner, the road surface drawing lamp system having the above configuration can draw the sequential light pattern in consideration of the obstacle that limits the view angle of the vehicle.

Advantageous Effects of Invention

According to the present disclosure, it is possible to provide a road surface drawing lamp and a road surface drawing lamp system in which a traffic participant around a vehicle can recognize a sequential light pattern at an early stage.

BRIEF DESCRIPTION OF DRAWINGS

FIG. 2 is a block diagram of the vehicle system according to the present embodiment.

DESCRIPTION OF EMBODIMENTS

Figure 1:
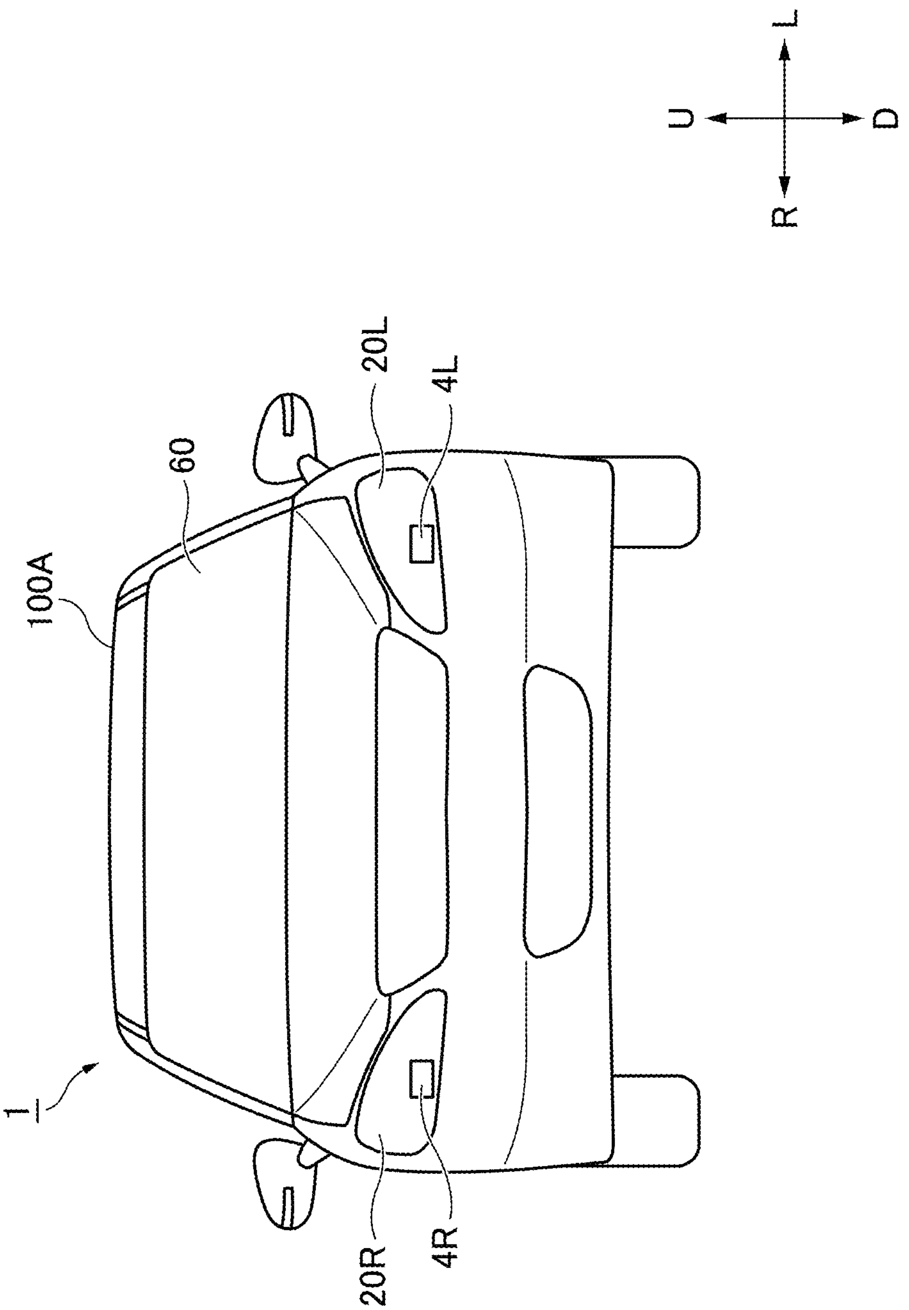
FIG. 1 is a front view of a vehicle on which a vehicle system according to an embodiment of the present disclosure (hereinafter, simply referred to as the present embodiment) is mounted.

Hereinafter, embodiments of the present disclosure (hereinafter, referred to as the present embodiment) will be described with reference to the drawings. Dimensions of members illustrated in the drawings may be different from actual dimensions of the members for convenience of description.

In the description of the present embodiment, a "left-right direction", an "up-down direction", and a "front-back direction" may be appropriately referred to, for convenience of description. The directions are relative directions set for a vehicle 1 illustrated in FIG. 1. Here, the "left-right direction" is a direction that includes a "left direction" and a "right direction", and is also a vehicle width direction of the vehicle 1. The "up-down direction" is a direction that includes an "up direction" and a "down direction". The "front-back direction" includes a "front direction" and a "back direction". Although not illustrated in FIG. 1, the front-back direction is a direction orthogonal to the left-right direction and the up-down direction. In the drawings, a reference numeral U denotes the up direction. A reference numeral D denotes the down direction. A reference numeral F denotes the front direction. A reference numeral B denotes the back direction. A reference numeral L denotes the left direction. A reference numeral R denotes the right direction.

First Embodiment

Figure 3:
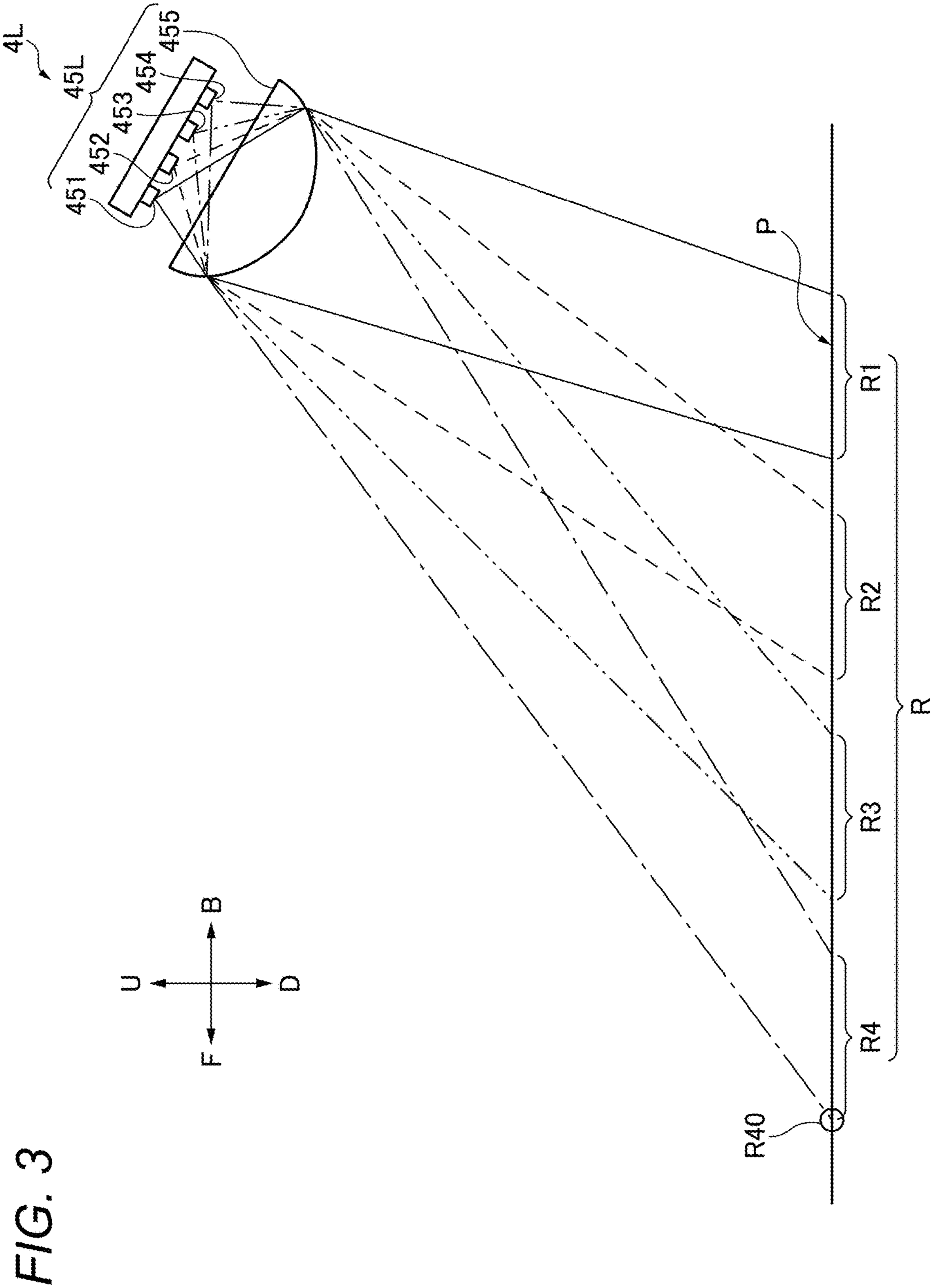
FIG. 3 is a diagram illustrating a state where a sequential light pattern is drawn on a road surface.

First, a vehicle system 2 according to the present embodiment will be described below with reference to FIGS. 1 to 3. FIG. 1 is a front view of the vehicle 1 on which the vehicle system 2 is mounted. FIG. 2 is a block diagram of the vehicle system 2. FIG. 3 is a diagram illustrating a state where a sequential light pattern is drawn on a road surface. The vehicle 1 is, for example, a vehicle (automatic vehicle) that can travel in a manual driving mode or an autonomous driving mode.

As illustrated in FIG. 2, the vehicle system 2 includes a vehicle control unit 3, a road surface drawing lamp system 400, and a sensor 5. The vehicle system 2 further includes a human machine interface (HMI) 8, a global positioning system (GPS) 9, a wireless communication unit 10, a storage device 11, a steering actuator 12, a steering device 13, a brake actuator 14, a brake device 15, an accelerator actuator 16, and an accelerator device 17.

The vehicle control unit 3 controls travelling of the vehicle 1. The vehicle control unit 3 includes, for example, at least one electronic control unit (ECU). The electronic control unit includes a computer system (for example, a system on a chip (SoC)) including one or more processors and one or more memories, and an electronic circuit including an active element such as a transistor and a passive element. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for autonomous driving. The RAM may temporarily store a vehicle control program, vehicle control data, and/or surrounding environment information indicating the surrounding environment of the vehicle. The processor may load a program designated from various vehicle control programs stored in the ROM on the RAM and execute various processes in cooperation with the RAM. The computer system may be implemented by a non-von Neumann computer such as an application specific integrated circuit (ASIC) or a field-programmable gate array (FPGA). Further, the computer system may be implemented by a combination of a von Neumann computer and a non-von Neumann computer.

The road surface drawing lamp system 400 includes a left front road surface drawing lamp unit 4L (hereinafter, simply referred to as a road surface drawing lamp unit 4L), a right front road surface drawing lamp unit 4R (hereinafter, simply referred to as a road surface drawing lamp unit 4R), a camera (an example of detection unit) 6, and a radar (an example of detection unit) 7.

As illustrated in FIG. 1, the road surface drawing lamp unit 4L is disposed in a housing of a left headlamp 20L. The road surface drawing lamp unit 4L may be provided separately from the left headlamp 20L. The road surface drawing lamp unit 4L may be disposed on a roof 100A of the vehicle 1 or may be disposed on a bumper of the vehicle 1. The road surface drawing lamp unit 4R is disposed in a housing of a right headlamp 20R. The road surface drawing lamp unit 4R may be provided separately from the right headlamp 20R. The road surface drawing lamp unit 4R may be disposed on the roof 100A of the vehicle 1 or May be disposed on the bumper of the vehicle 1. As illustrated in FIG. 2, the road surface drawing lamp unit 4L includes a road surface drawing lamp 45L and a lamp control unit 46L. The road surface drawing lamp unit 4R includes a road surface drawing lamp 45R and a lamp control unit 46R. Details of the road surface drawing lamp unit 4L and the road surface drawing lamp unit 4R will be described later.

The sensor 5 will be described. The sensor 5 includes at least one of an acceleration sensor, a speed sensor, and a gyro sensor. The sensor 5 detects a travel state of the vehicle 1 and outputs travel state information to the vehicle control unit 3. The sensor 5 may further include a seating sensor that detects whether a driver is sitting on a driver's seat, a face direction sensor that detects a direction of the face of the driver, an external weather sensor that detects an external weather condition, a human sensor that detects whether there is a person in the vehicle, and the like.

The camera 6 is, for example, a camera including an imaging element such as a charge-coupled device (CCD) or a complementary MOS (CMOS). The camera 6 detects the surrounding environment information indicating the surrounding environment of the vehicle 1, and transmits the surrounding environment information to the lamp control units 46L and 46R via the vehicle control unit 3. The surrounding environment information includes obstacle information on an obstacle that limits a view angle of the vehicle 1. Examples of such an obstacle include a wall, a sign, and another vehicle provided on the sides of the road. The obstacle information includes type information on a type of the obstacle, position information on a position of the obstacle, and the like.

The radar 7 includes at least one of a millimeter wave radar, a microwave radar, and a LiDAR unit. For example, the LiDAR unit detects the surrounding environment information based on point cloud data indicating the surrounding environment of the vehicle 1, and transmits the surrounding environment information to the lamp control units 46L and 46R via the vehicle control unit 3. The surrounding environment information detected by the radar 7 also includes the obstacle information.

The HMI 8 includes an input unit that receives an input operation from the driver and an output unit that outputs travel information of the vehicle 1 and the like to the driver. The input unit includes a steering wheel, an accelerator pedal, a brake pedal, a driving mode changeover switch for changing a driving mode of the vehicle 1, and the like. The output unit is a display device (for example, HUD) that displays various travel information. The HUD displays the travel information of the vehicle 1 on a front window 60. The GPS 9 acquires current position information on the vehicle 1 and outputs the acquired current position information to the vehicle control unit 3.

The wireless communication unit 10 receives information (for example, travel information) on one another vehicle around the vehicle 1 from the other vehicle and transmits information (for example, travel information) on the vehicle 1 to the other vehicle (vehicle-to-vehicle communication). The wireless communication unit 10 receives infrastructure information from infrastructure equipment such as a traffic light and a marker lamp, and transmits the travel information on the vehicle 1 to the infrastructure equipment (road-to-vehicle communication). The wireless communication unit 10 receives information on a pedestrian from a portable electronic device (smartphone, tablet, wearable device, or the like) carried by the pedestrian, and transmits host vehicle travel information on the vehicle 1 to the portable electronic device (pedestrian-to-vehicle communication). The vehicle 1 may directly communicate with another vehicle, infrastructure equipment, or a portable electronic device by an ad hoc mode, or may communicate with another vehicle, infrastructure equipment, or a portable electronic device via an access point. Further, the vehicle 1 may communicate with another vehicle, infrastructure equipment, or portable electronic device via a communication network such as the Internet.

The storage device 11 is an external storage device such as a hard disk drive (HDD) or a solid state drive (SSD). The storage device 11 may store two-dimensional or three-dimensional map information and/or a vehicle control program. For example, the three-dimensional map information may be implemented by point cloud data. The storage device 11 outputs the map information and the vehicle control program to the vehicle control unit 3 in response to a request from the vehicle control unit 3. The map information and the vehicle control program may be updated via the wireless communication unit 10 and the communication network.

When the vehicle 1 travels in the autonomous driving mode, the vehicle control unit 3 autonomously generates at least one of a steering control signal, an accelerator control signal, and a brake control signal based on the travel state information, the surrounding environment information, the current position information, the map information, and the like. The steering actuator 12 receives the steering control signal from the vehicle control unit 3 and controls the steering device 13 based on the received steering control signal. The brake actuator 14 receives the brake control signal from the vehicle control unit 3 and controls the brake device 15 based on the received brake control signal. The accelerator actuator 16 receives the accelerator control signal from the vehicle control unit 3 and controls the accelerator device 17 based on the received accelerator control signal.

On the other hand, when the vehicle 1 travels in the manual driving mode, the vehicle control unit 3 generates the steering control signal, the accelerator control signal, and the brake control signal according to a manual operation of the driver with respect to the accelerator pedal, the brake pedal, and the steering wheel. In this manner, since the steering control signal, the accelerator control signal, and the brake control signal are generated by the manual operation of the driver in the manual driving mode, the traveling of the vehicle 1 is controlled by the driver.

Next, the road surface drawing lamp unit 4L will be described. As illustrated in FIG. 3, the road surface drawing lamp unit 4L draws a sequential light pattern P on the road surface around the vehicle 1 so as to present information indicating the behavior of the vehicle 1 toward the outside of the vehicle 1. A projection method or a scanning method may be adopted as a drawing method of the road surface drawing lamp unit 4L. The information indicating the behavior of the vehicle 1 is, for example, information indicating a left turn of the vehicle 1. For example, when the left turn of the vehicle 1 is determined, the road surface drawing lamp unit 4L draws the sequential light pattern P on the road surface in order to present the left turn of the vehicle 1 to the outside. In the sequential light pattern P, the irradiation region changes in a sequential manner with the elapse of time.

The sequential light pattern P is drawn in a drawing region R set in a surrounding region of the vehicle 1. The drawing region R includes a first region (an example of nearest region) R1, a second region (an example of intermediate region) R2, a third region (an example of intermediate region) R3, and a fourth region (an example of farthest region) R4. The fourth region R4 includes a tip portion R40. The first region R1, the second region R2, the third region R3, and the fourth region R4 are arranged in this order from the rear to the front when a traveling direction of the vehicle 1 is defined as the front direction. The first region R1, the second region R2, the third region R3, and the fourth region R4 have the same size. However, the sizes of the first region R1, the second region R2, the third region R3, and the fourth region R4 may be different.

The road surface drawing lamp 45L includes a first light source 451, a second light source 452, a third light source 453, a fourth light source 454, and a projection lens 455. The first light source 451 to the fourth light source 454 may be implemented by, for example, a plurality of light emitting diode (LED) elements or laser diode (LD) elements. The projection lens 455 may be implemented by, for example, a free-form-surface lens. The free-form-surface lens is a lens in which at least one of an emission surface and an incidence surface is implemented by a free-form surface. A road surface around the vehicle 1 is irradiated with light emitted from the first light source 451 to the fourth light source 454 via the projection lens 455. In the embodiment illustrated in FIG. 3, the first region R1 is irradiated with the light emitted from the first light source 451. The second region R2 is irradiated with the light emitted from the second light source 452. The third region R3 is irradiated with the light emitted from the third light source 453. The fourth region R4 is irradiated with the light emitted from the fourth light source 454. Turning on and off of the first light source 451 to the fourth light source 454 is controlled by the lamp control unit 46L (see FIG. 2), so that the sequential light pattern P formed in the drawing region R changes.

The road surface drawing lamp 45L may include, for example, a light source unit that emits light, a drive mirror, and an optical system such as a lens or a mirror. The drive mirror draws the sequential light pattern P on the road surface by irradiating the road surface with light emitted from the light source unit. The drive mirror may include, for example, a micro electro mechanical systems (MEMS) mirror, a digital mirror device (DMD), or a blade mirror. For example, the light emitted from the light source unit may be scanned on the road surface by the MEMS mirror. In this manner, the light pattern may be drawn on the road surface by light scanning by the MEMS mirror.

Returning to FIG. 2, the lamp control unit 46L will be described. The lamp control unit 46L controls the road surface drawing lamp 45L such that the sequential light pattern P is drawn on the road surface around the vehicle 1. A placement position of the lamp control unit 46L is not particularly limited. The lamp control unit 46L includes a microcontroller and an analog drive control circuit. The microcontroller includes a processor such as a CPU and a memory such as a ROM. The analog drive control circuit includes a current control circuit that controls a current supplied to the first light source 451 to the fourth light source 454. When the road surface drawing lamp includes a drive mirror and the sequential light pattern P is changed by driving the drive mirror, the analog drive control circuit includes a mirror drive circuit that controls the drive mirror.

For example, in a case where the vehicle control unit 3 determines the left turn of the vehicle 1 or in a case where the left turn of the vehicle is determined in accordance with an operation by the driver (for example, operation of blinker lever), the vehicle control unit 3 transmits a signal indicating that the travel state of the vehicle 1 changes to the lamp control unit 46L. The lamp control unit 46L controls the driving of the road surface drawing lamp 45L so that the sequential light pattern P is drawn on the road surface based on the signal transmitted from the vehicle control unit 3. In the present embodiment, the lamp control unit 46L is separated from the vehicle control unit 3, but may be implemented integrally with the vehicle control unit 3.

The road surface drawing lamp unit 4R may have the same configuration as the road surface drawing lamp unit 4L. Similarly to the road surface drawing lamp unit 4L, the road surface drawing lamp unit 4R draws a sequential light pattern on the road surface around the vehicle 1 so as to present information indicating the behavior of the vehicle 1 toward the outside of the vehicle 1. In the road surface drawing lamp unit 4R, a projection method or a scanning method may also be adopted as a drawing method of the road surface drawing lamp unit 4R. The information indicating the behavior of the vehicle 1 is, for example, information indicating a right turn of the vehicle 1. For example, when the right turn of the vehicle 1 is determined, the road surface drawing lamp 45R draws the sequential light pattern on the road surface in order to present the right turn of the vehicle 1 to the outside. The sequential light pattern emitted from the road surface drawing lamp unit 4R is basically the same as the sequential light pattern P emitted from the road surface drawing lamp unit 4L.

Figure 4:
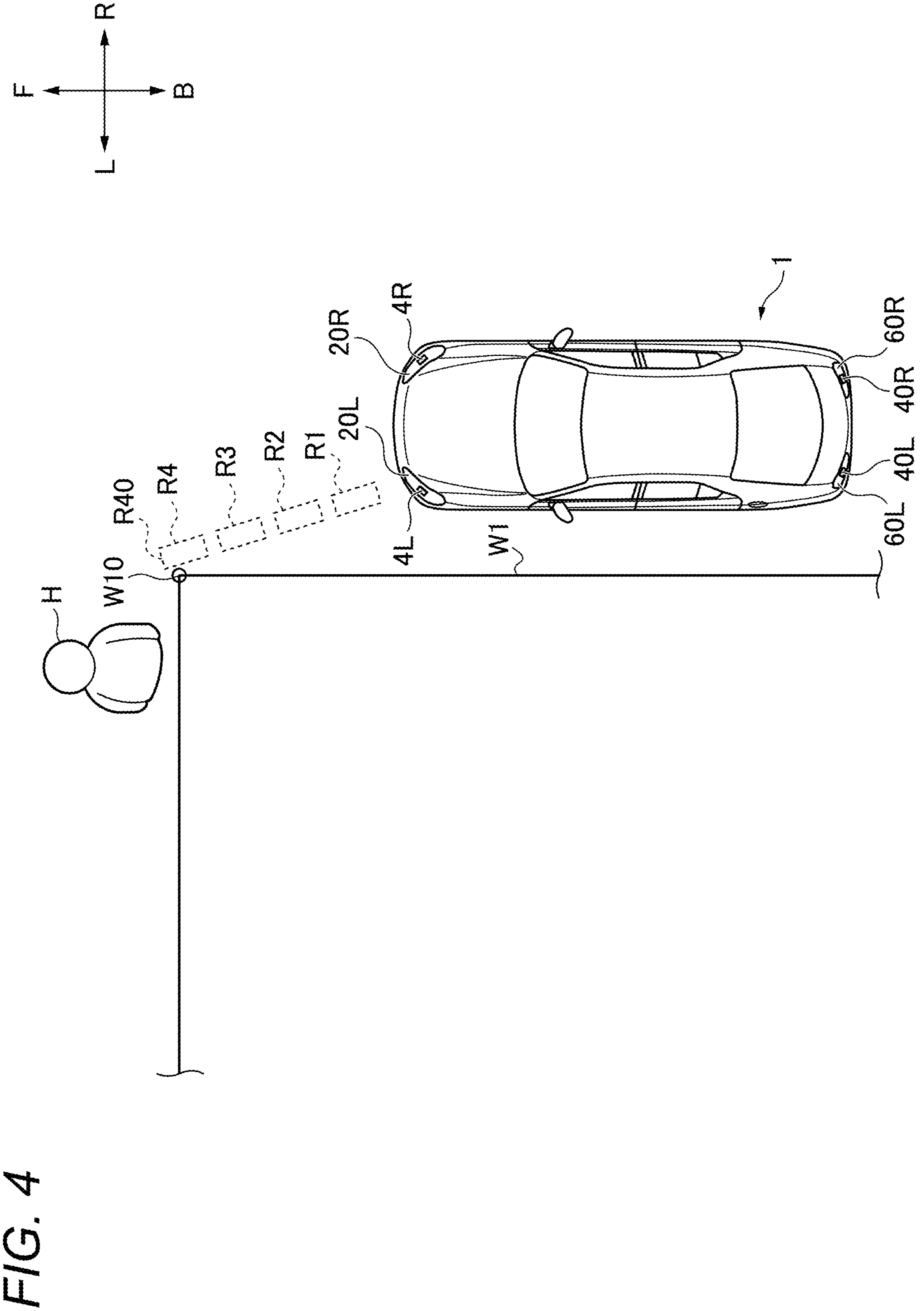
FIG. 4 is a diagram illustrating a state where a sequential light pattern is not drawn on a road surface in the first embodiment.

In the present embodiment, the road surface drawing lamp units 4L and 4R disposed on the front side of the vehicle 1 are described for convenience of description, but the road surface drawing lamp units may also be disposed on a rear side of the vehicle 1. In this case, as illustrated in FIG. 4, a left rear road surface drawing lamp unit 40L (hereinafter, simply referred to as a road surface drawing lamp unit 40L) may be disposed in a housing of a left rear combination lamp 60L of the vehicle 1. A right rear road surface drawing lamp unit 40R (hereinafter, simply referred to as a road surface drawing lamp unit 40R) may be disposed in a housing of a right rear combination lamp 60R of the vehicle 1. The road surface drawing lamp unit 40L draws a sequential light pattern P13 (see FIG. 11) on the road surface in order to present information indicating a backward movement of the vehicle 1 to the outside of the vehicle 1. The road surface drawing lamp unit 40R draws a sequential light pattern P14 (see FIG. 11) on the road surface in order to present information indicating a backward movement of the vehicle 1 to the outside of the vehicle 1.

Figure 5:
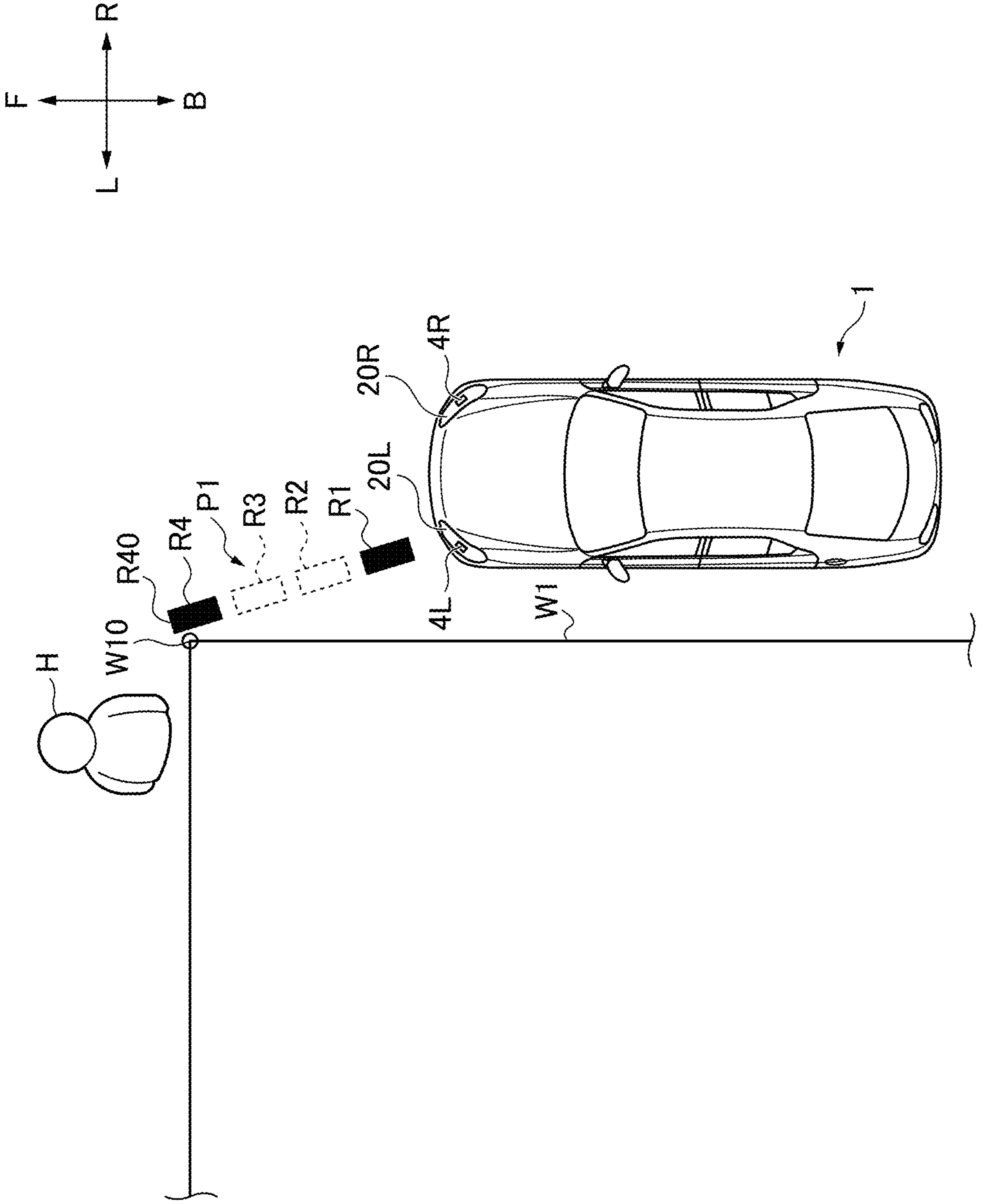
FIG. 5 is a diagram illustrating a state where a first light pattern is drawn on the road surface in the first embodiment.
Figure 6:
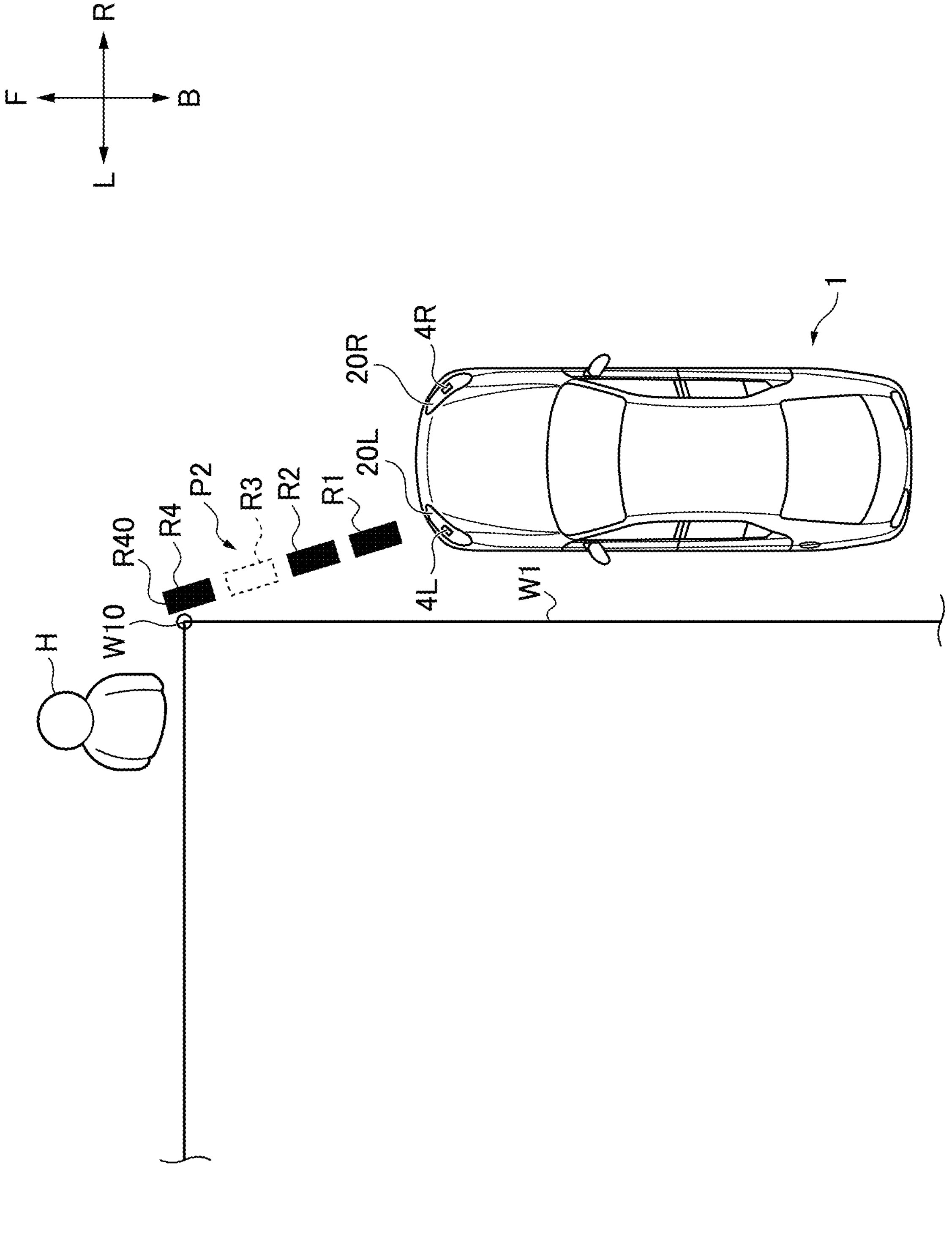
FIG. 6 is a diagram illustrating a state where a second light pattern is drawn on the road surface in the first embodiment.
Figure 7:
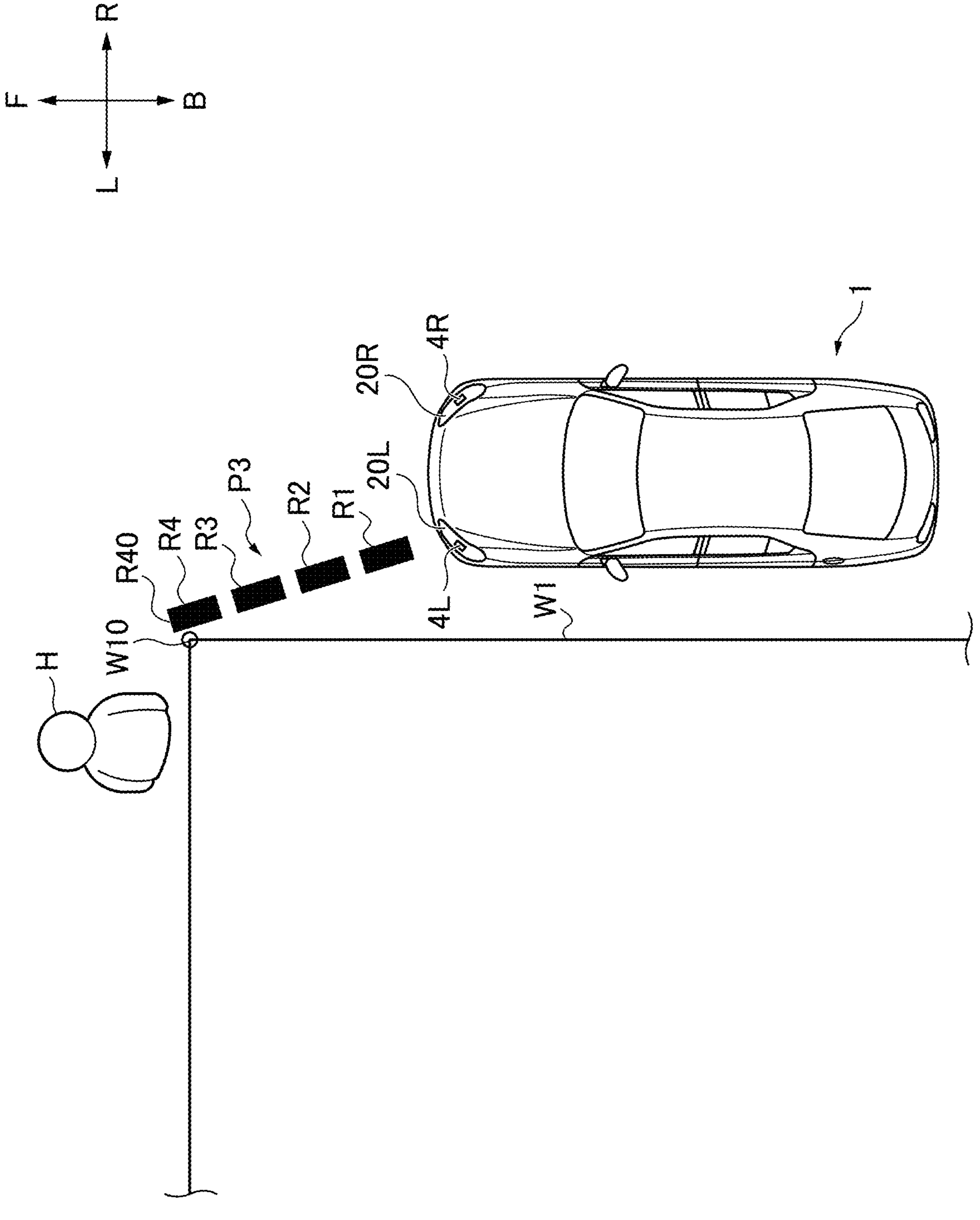
FIG. 7 is a diagram illustrating a state where a third light pattern is drawn on the road surface in the first embodiment.

Next, a state where the sequential light pattern P is drawn on the road surface around the vehicle 1 will be described with reference to FIGS. 4 to 7. FIG. 4 is a diagram illustrating a state where the sequential light pattern P is not drawn on the road surface. FIG. 5 is a diagram illustrating a state where a first light pattern P1 is drawn on the road surface. FIG. 6 is a diagram illustrating a state where a second light pattern P2 is drawn on the road surface. FIG. 7 is a diagram illustrating a state where a third light pattern P3 is drawn on the road surface. Broken line portions in FIGS. 4 to 6 indicate respective regions of the first region R1 to the fourth region R4 included in the drawing region R. A region in which an inner side of the broken line portion is blank is a region that is not irradiated with light from the road surface drawing lamp 45L.

In the present embodiment, the road surface drawing lamp unit 4L includes a swivel mechanism (not illustrated) capable of changing orientation of an optical axis by rotating the road surface drawing lamp 45L in a desired direction. As illustrated in FIGS. 4 to 7, a pedestrian (an example of traffic participant) H is present on the left front side of the vehicle 1. There is a wall (an example of obstacle) W1 on the left side of the vehicle 1 and on the rear side of the pedestrian H.

The sequential light pattern P includes the first light pattern P1 (see FIG. 5), the second light pattern P2 (see FIG. 6), and the third light pattern P3 (see FIG. 7). The first light pattern P1 is formed by irradiating the first region R1 and the fourth region R4 with light. The second light pattern P2 is formed by irradiating the first region R1, the second region R2, and the fourth region R4 with light. The third light pattern P3 is formed by irradiating the first region R1, the second region R2, the third region R3, and the fourth region R4 with light.

As illustrated in FIG. 4, the sequential light pattern P is not drawn on the road surface around the vehicle 1 before the left turn of the vehicle 1 is determined.

When the left turn of the vehicle 1 is determined, the vehicle control unit 3 transmits a signal indicating that the travel state of the vehicle 1 changes to the lamp control unit 46L. The lamp control unit 46L controls driving of the road surface drawing lamp 45L so that the sequential light pattern P is drawn on the road surface based on the signal transmitted from the vehicle control unit 3.

When the left turn of the vehicle 1 is determined, the vehicle control unit 3 controls the camera 6 and the radar 7 to transmit the surrounding environment information including the obstacle information on the obstacle that limits the view angle of the vehicle 1 to the lamp control unit 46L via the vehicle control unit 3. At least one of the camera 6 and the radar 7 detects the wall W1 based on the control signal from the vehicle control unit 3, and transmits surrounding environment information including obstacle information on the wall W1 to the lamp control unit 46L via the vehicle control unit 3. The lamp control unit 46L determines that the wall W1 is present on the left side of the vehicle 1 based on the obstacle information included in the received surrounding environment information. When it is determined that the wall W1 is present on the left side of the vehicle 1, the lamp control unit 46L sets the drawing region R (see FIG. 3) such that the sequential light pattern P is drawn in the vicinity of a position W10 corresponding to an edge of the wall W1 based on position information on a position of the wall W1. The position W10 is a position where an outer edge of the drawing region R is as close as possible to the wall W1, and is a position where the road surface drawing R does not overlap the wall W1. Then, the lamp control unit 46L controls the swivel mechanism to rotate the road surface drawing lamp 45L so that the sequential light pattern P is drawn in the drawing region R. In this manner, the sequential light pattern P is drawn in the drawing region R by rotating the road surface drawing lamp 45L to a desired position.

As illustrated in FIG. 5, when the sequential light pattern P is drawn on the road surface, the road surface drawing lamp 45L first draws the first light pattern P1 on the road surface in front of the vehicle 1. That is, the road surface drawing lamp 45L irradiates the first region R1 closest to the vehicle 1 and the fourth region R4 farthest from the vehicle 1 with light. The tip portion R40 of the fourth region R4 exists in a range of 2 m or more and 10 m or less from the vehicle 1.

As illustrated in FIG. 6, the road surface drawing lamp 45L draws the second light pattern P2 on the road surface after drawing the first light pattern P1 on the road surface. The road surface drawing lamp 45L draws the second light pattern P2 on the road surface, for example, about 0.1 seconds to 0.4 seconds after drawing the first light pattern P1 on the road surface. That is, in the state illustrated in FIG. 6, the road surface drawing lamp 45L irradiates the second region R2 with light in addition to the first region R1 and the fourth region R4.

As illustrated in FIG. 7, the road surface drawing lamp 45L draws the third light pattern P3 on the road surface after drawing the second light pattern P2 on the road surface. The road surface drawing lamp 45L draws the third light pattern P3 on the road surface, for example, about 0.1 seconds to 0.4 seconds after drawing the second light pattern P2 on the road surface. That is, the road surface drawing lamp 45L irradiates the third region R3 with light in addition to the first region R1, the second region R2, and the fourth region R4.

The road surface drawing lamp 45L ends the drawing of the sequential light pattern P about 0.1 seconds to 0.4 seconds after drawing the third light pattern P3 on the road surface. The road surface drawing lamp 45L may repeatedly perform the above operation. An interval from the start of drawing of the sequential light pattern P to the end of the drawing (one period of the sequential light pattern P) is, for example, about 0.3 seconds to 1.2 seconds. Drawing intervals of the light patterns may be equal to or different from one another.

In the present embodiment, a shape of the sequential light pattern P is rectangular, but the shape of the sequential light pattern P is not particularly limited. The shape of the sequential light pattern P may be, for example, circular or arrow: In the present embodiment, there are gaps among the first region R1 and the fourth region R4, but the first region R1 to the fourth region R4 may be arranged without gaps.

Here, for example, in a case where an obstacle such as a wall that limits the view angle of the vehicle is present around the vehicle, there is a concern that the traffic participant around the vehicle cannot notice a sequential light pattern at an early stage even when the sequential light pattern is drawn on the road surface.

This point will be specifically described with reference to FIG. 4. The sequential light pattern P is often formed by moving an image from a side close to the vehicle 1 toward a side far from the vehicle 1 along the traveling direction of the host vehicle. However, as illustrated in FIG. 4, an obstacle such as the wall W1 may exist on a virtual line connecting the pedestrian H and the first region R1, and the pedestrian H may not be able to visually recognize the first region R1. Even when a positional relation among the vehicle 1, the wall W1, and the pedestrian H is the positional relation as illustrated in FIG. 4, the pedestrian H can easily recognize the sequential light pattern P in a case where the light pattern is drawn first in the farthest region R4 as in the present disclosure because an obstacle such as the wall W1 is rarely present between the pedestrian H and the fourth region R4. With the road surface drawing lamp 45L having the above configuration, the road surface drawing lamp 45L first forms the first light pattern P1 drawn in the first region R1 and the fourth region R4 including the tip portion R40 as the sequential light pattern P. That is, since the sequential light pattern P to be drawn first is the first light pattern P1, the light pattern is first drawn at the tip portion R40 of the drawing region R. Therefore, with the road surface drawing lamp 45L, the pedestrian H around the vehicle 1 can recognize the sequential light pattern P at an early stage.

With the road surface drawing lamp 45L having the above configuration, the first light pattern P1 is drawn in the first region R1 and the fourth region R4. That is, since the light pattern is first drawn in the fourth region R4 which is the farthest region from the vehicle 1, the pedestrian H around the vehicle 1 can recognize the sequential light pattern P at an early stage.

When the travel state of the vehicle 1 changes, it is highly necessary for the pedestrian H around the vehicle 1 to know the travel state of the vehicle 1. With the road surface drawing lamp 45L having the above configuration, the road surface drawing lamp 45L draws the sequential light pattern P in the drawing region R when a signal indicating the change in the travel state is acquired from the vehicle 1. Therefore, with the road surface drawing lamp 45L, the pedestrian H can recognize the sequential light pattern P at an early stage when the travel state of the vehicle 1 changes.

With the road surface drawing lamp 45L having the above configuration, the tip portion R40 of the drawing region R is present in a range of 2 m or more and 10 m or less from the vehicle 1, which is a range in which the pedestrian H around the vehicle 1 can easily visually recognize the sequential light pattern P. Therefore, the pedestrian H around the vehicle 1 can appropriately recognize the sequential light pattern P at an early stage.

With the road surface drawing lamp system 400 having the above configuration, when obstacle information on the wall W1 that limits a view angle of a vehicle around the vehicle 1 is detected, the lamp control unit 46L controls the road surface drawing lamp 45L such that the sequential light pattern P is drawn based on the detected obstacle information. In this manner, the road surface drawing lamp system 400 can draw the sequential light pattern P in consideration of presence of the wall W1 that limits the view angle of the vehicle 1.

In the embodiment described above, an embodiment is described in which the road surface drawing lamp 45L includes a swivel mechanism, and the drawing region R is set aiming at the position W10 corresponding to the edge of the wall W1, but the road surface drawing lamp 45L may not include a swivel mechanism.

Second Embodiment

Next, a second embodiment will be described with reference to FIGS. 4 to 7. In the present embodiment, the same components as those in the first embodiment are denoted by the same reference numerals, and the overlapping description will be appropriately omitted. The present embodiment is different from the first embodiment in that each of the road surface drawing lamps 45L and 45R includes a light source unit that emits light, a drive mirror, and an optical system such as a lens and a mirror. In the present embodiment, configurations other than the road surface drawing lamps 45L and 45R are the same as those in the first embodiment. In the present embodiment, the vehicle 1 attempts to turn left.

As illustrated in FIG. 4, the sequential light pattern P is not drawn on the road surface around the vehicle 1 before the left turn of the vehicle 1 is determined. However, when the left turn of the vehicle 1 is determined, the vehicle control unit 3 transmits a signal indicating that a travel state of the vehicle 1 changes to the lamp control unit 46L in the same principle as in the first embodiment. The lamp control unit 46L controls driving of the road surface drawing lamp 45L so that the sequential light pattern P is drawn on the road surface based on the signal transmitted from the vehicle control unit 3.

In the present embodiment, the sequential light pattern P similar to that in the first embodiment is also drawn in the drawing region R, as illustrated in FIGS. 5 to 7. However, control of the road surface drawing lamp 45L in the present embodiment is different from control of the road surface drawing lamp 45L in the first embodiment. In the present embodiment, when it is determined that the wall W1 is present on the left side of the vehicle 1, the lamp control unit 46L sets the drawing region R (see FIG. 3) such that the sequential light pattern P is drawn in the vicinity of the position W10 corresponding to an edge of the wall W1 based on position information on a position of the wall W1. Then, the lamp control unit 46L controls the drive mirror such that the sequential light pattern P is drawn in the drawing region R, and scans the road surface with the light emitted from the light source unit. In this manner, the sequential light pattern P is drawn in the drawing region R. A state where each of the first light pattern P1, the second light pattern P2, and the third light pattern P3 in the present embodiment is drawn on the road surface is the same as that in the first embodiment, and therefore, the description thereof will be omitted.

With the road surface drawing lamp 45L and the road surface drawing lamp system 400 having the above configuration, the same effects as those of the first embodiment can be exerted.

Third Embodiment

Figure 8:
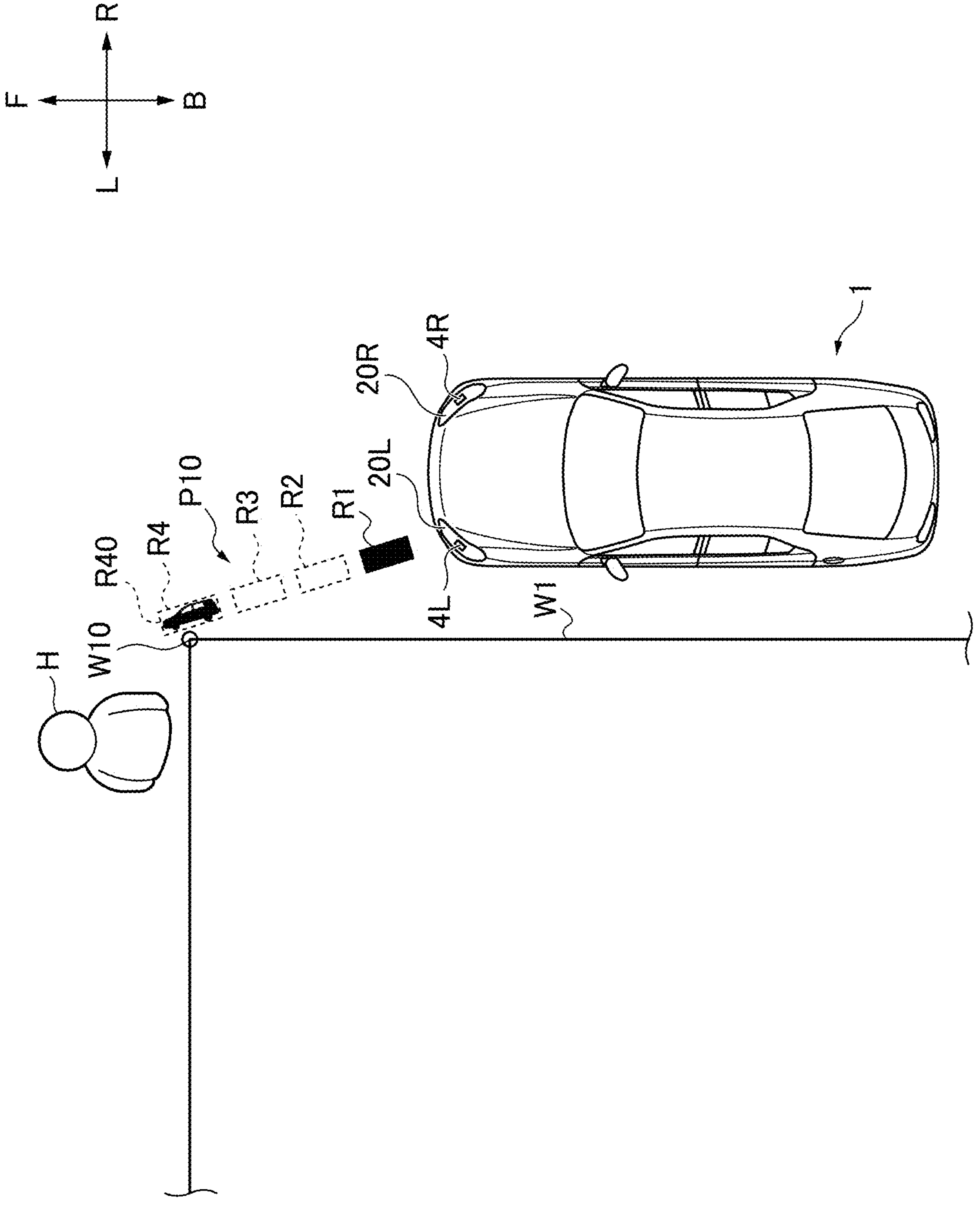
FIG. 8 is a diagram illustrating a state where a first light pattern is drawn on a road surface in a third embodiment.

Next, a third embodiment will be described with reference to FIGS. 4 and 6 to 8. FIG. 8 is a diagram illustrating a state where a first light pattern P10 is drawn on the road surface in the third embodiment. In the present embodiment, the same components as those in the first embodiment are denoted by the same reference numerals, and the overlapping description will be appropriately omitted. In the present embodiment, the vehicle 1 attempts to turn left. Further, in the present embodiment, the sequential light pattern P includes the first light pattern P10, the second light pattern P2, and the third light pattern P3. The second light pattern P2 and the third light pattern P3 in the present embodiment are the same as the second light pattern P2 and the third light pattern P3 in the first embodiment, but the first light pattern P10 is different from the first light pattern P1 in the first embodiment as described later.

As illustrated in FIG. 4, the sequential light pattern P is not drawn on the road surface around the vehicle 1 before the left turn of the vehicle 1 is determined. When the left turn of the vehicle 1 is determined, the vehicle control unit 3 transmits a signal indicating that a travel state of the vehicle 1 changes to the lamp control unit 46L. The lamp control unit 46L controls driving of the road surface drawing lamp 45L so that the sequential light pattern P is drawn on the road surface based on the signal transmitted from the vehicle control unit 3. When the left turn of the vehicle 1 is determined, at least one of the camera 6 and the radar 7 transmits surrounding environment information including obstacle information on the wall W1 to the lamp control unit 46L via the vehicle control unit 3 as in the first embodiment. The lamp control unit 46L determines that the wall W1 is present on the left side of the vehicle 1 and sets the drawing region R (see FIG. 3) such that the sequential light pattern P is drawn in the vicinity of the position W10 corresponding to the edge of the wall W1 based on the position information on a position of the wall W1. Then, the lamp control unit 46L controls a swivel mechanism to rotate the road surface drawing lamp 45L so that the sequential light pattern P is drawn in the drawing region R.

As illustrated in FIG. 8, when the sequential light pattern P is drawn on the road surface, the road surface drawing lamp 45L first draws the first light pattern P10 including vehicle information on the road surface in front of the vehicle 1. The vehicle information is, for example, vehicle type information on a type of the vehicle (automatic vehicle, bike, truck, or the like), scheduled travel information on a scheduled travel direction of the vehicle, or speed information on a speed of the vehicle. In the state illustrated in FIG. 8, the road surface drawing lamp 45L draws a rectangular light pattern in the first region R1 located closest to the vehicle 1, and draws a light pattern having an automatic vehicle shape in the fourth region R4 located far from the vehicle 1, that is, in the vicinity of the tip portion R40. The shape of the light pattern drawn in the fourth region R4 indicates the type of the vehicle 1 on which the road surface drawing lamp 45L that draws the first light pattern P10 is mounted. That is, the light pattern drawn in the fourth region R4 includes the vehicle type information (an example of vehicle information).

As illustrated in FIG. 8, the pedestrian H can recognize the light pattern including the vehicle type information drawn in the fourth region R4. Therefore, the pedestrian H can recognize that the vehicle 1 which is an automatic vehicle is present around the pedestrian H, at a time point when the first light pattern P10 is drawn on the road surface.

The road surface drawing lamp 45L draws the second light pattern P2 on the road surface, for example, about 0.1 seconds to 0.4 after drawing the first light pattern P10 on the road surface (see FIG. 6). Further, the road surface drawing lamp 45L draws the third light pattern P3 on the road surface, for example, about 0.1 seconds to 0.4 seconds after drawing the second light pattern P2 on the road surface (see FIG. 7). Then, the road surface drawing lamp 45L ends the drawing of the sequential light pattern P about 0.1 seconds to 0.4 seconds after drawing the third light pattern P3 on the road surface.

With the road surface drawing lamp 45L and the road surface drawing lamp system 400 having the above configuration, the same effects as those of the first embodiment can be exerted.

With the road surface drawing lamp 45L having the above configuration, the vehicle type information is drawn in the fourth region R4, that is, in the vicinity of the tip portion R40. Therefore, the pedestrian H around the vehicle 1 can recognize the sequential light pattern P at an early stage and can also recognize the vehicle type information on the nearby vehicle 1 at an early stage.

Fourth Embodiment

Figure 9:
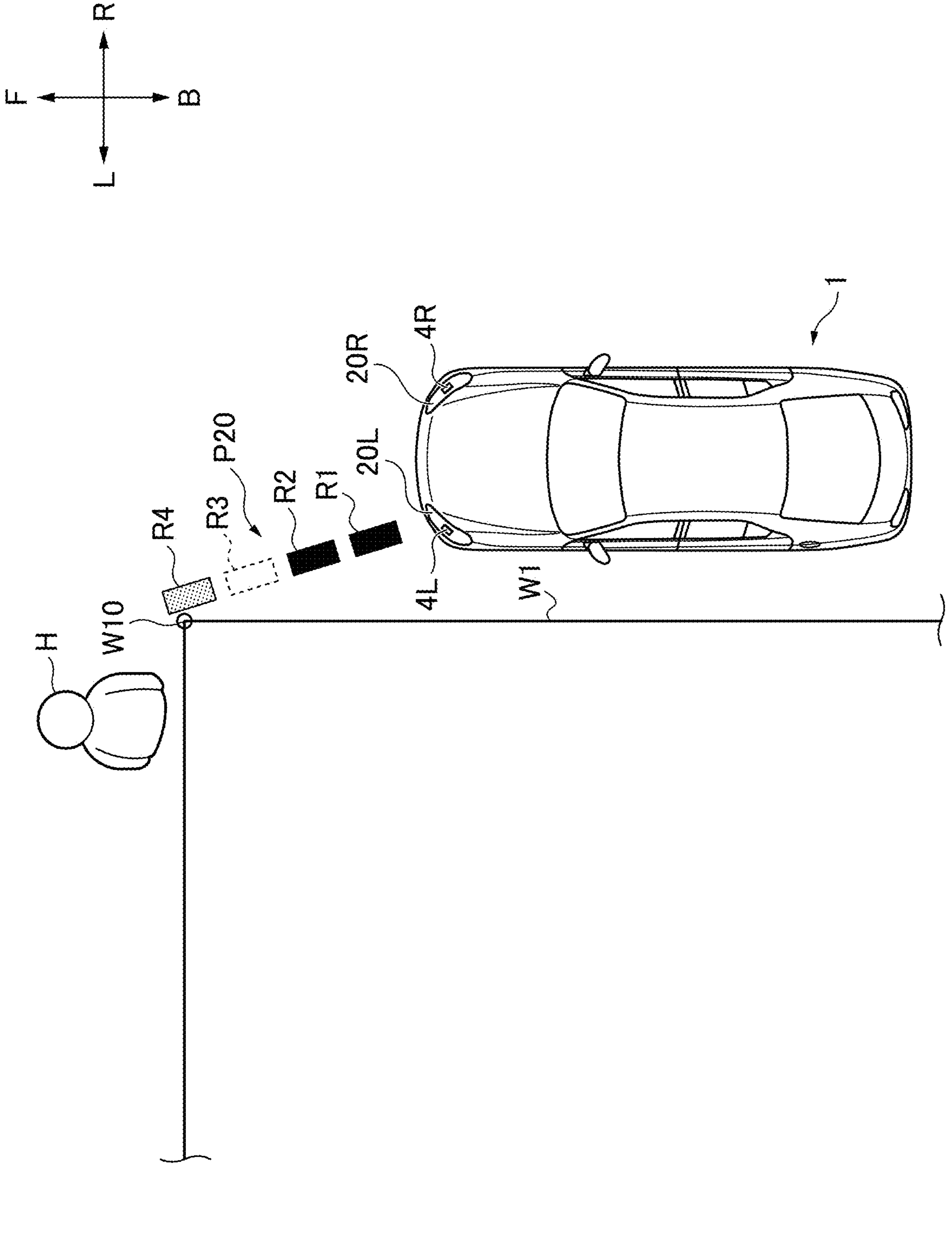
FIG. 9 is a diagram illustrating a state where a second light pattern is drawn on a road surface in a fourth embodiment.

Next, a fourth embodiment will be described with reference to FIGS. 4, 5, 7, and 9. FIG. 9 is a diagram illustrating a state where a second light pattern P20 is drawn on the road surface in the fourth embodiment. In the present embodiment, the same components as those in the first embodiment are denoted by the same reference numerals, and the overlapping description will be appropriately omitted. In the present embodiment, the vehicle 1 attempts to turn left. Further, in the present embodiment, the sequential light pattern P includes the first light pattern P1, the second light pattern P20, and the third light pattern P3. The first light pattern P1 and the third light pattern P3 in the present embodiment are similar to the first light pattern P1 and the third light pattern P3 in the first embodiment, but the second light pattern P20 is different from the second light pattern P2 in the first embodiment as described later.

As illustrated in FIG. 4, the sequential light pattern P is not drawn on the road surface around the vehicle 1 before the left turn of the vehicle 1 is determined. When the left turn of the vehicle 1 is determined, the first light pattern P1 is drawn on the road surface in front of the vehicle 1 according to the same principle as the first embodiment, as illustrated in FIG. 5.

As illustrated in FIG. 9, the road surface drawing lamp 45L draws the second light pattern P20 on the road surface, for example, about 0.1 seconds to 0.4 seconds after drawing the first light pattern P1 on the road surface. At this time, the road surface drawing lamp 45L makes illuminance of the light with which the fourth region R4 is irradiated at the time of drawing the second light pattern P20 lower than illuminance of the light with which the fourth region R4 is irradiated at the time of drawing the first light pattern P1. That is, the road surface drawing lamp 45L draws the first light pattern P1 and then draws the sequential light pattern P such that the illuminance thereof gradually decreases.

The road surface drawing lamp 45L draws the third light pattern P3 on the road surface, for example, about 0.1 seconds to 0.4 seconds after drawing the second light pattern P20 on the road surface (see FIG. 7). Then, the road surface drawing lamp 45L ends the drawing of the sequential light pattern P about 0.1 seconds to 0.4 seconds after drawing the third light pattern P3 on the road surface.

With the road surface drawing lamp 45L and the road surface drawing lamp system 400 having the above configuration, the same effects as those of the first embodiment can be exerted.

With the road surface drawing lamp 45L having the above configuration, the road surface drawing lamp 45L draws the first light pattern P1 and then draws the sequential light pattern P such that the illuminance thereof gradually decreases. That is, since the illuminance of the first light pattern P1 drawn first is the highest, it is possible to maintain the design of the sequential light pattern P while causing the pedestrian H around the vehicle 1 to recognize the sequential light pattern P at an early stage.

Fifth Embodiment

Figure 10:
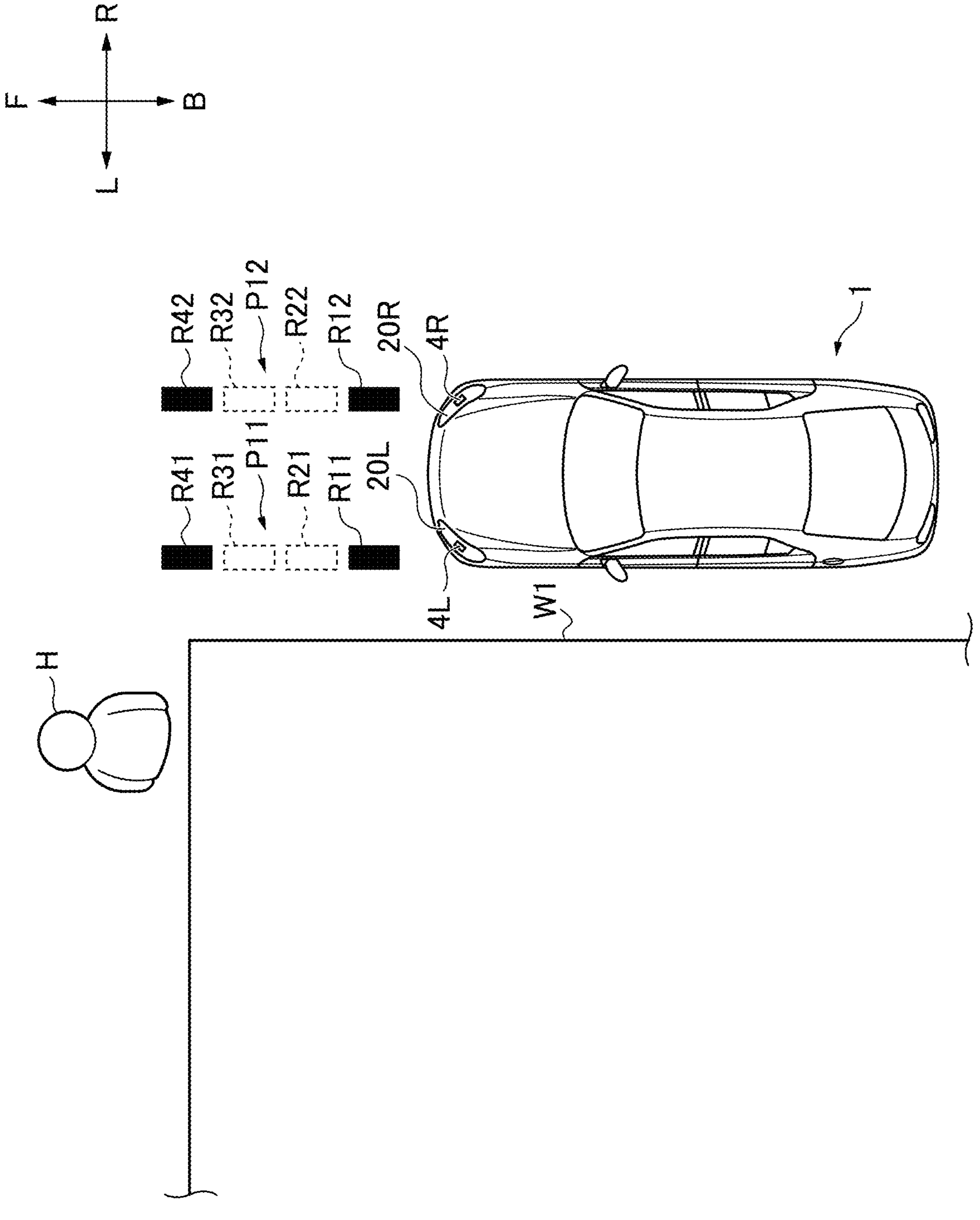
FIG. 10 is a diagram illustrating a state where a first light pattern is drawn on a road surface in a fifth embodiment.

Next, a fifth embodiment will be described with reference to FIG. 10. FIG. 10 is a diagram illustrating a state where first light patterns P11 and P12 are drawn on the road surface in the fifth embodiment. In the present embodiment, the same components as those in the first embodiment are denoted by the same reference numerals, and the overlapping description will be appropriately omitted. In the present embodiment, the vehicle control unit 3 determines start of the vehicle 1 based on travel state information received from the sensor 5, and the vehicle control unit 3 determines the start of the vehicle 1 in response to a driver operating a drive range. In the present embodiment, the sequential light pattern P includes the first light patterns P11 and P12, a second light pattern to be described later, and a third light pattern to be described later.

Before the start of the vehicle 1 is determined, the sequential light pattern P is not drawn on the road surface around the vehicle 1. When the start of the vehicle 1 is determined, the first light patterns P11 and P12 are drawn on the road surface in front of the vehicle 1 according to the same principle as the first embodiment, as illustrated in FIG. 10. The first light pattern P11 is formed by emitting light from the road surface drawing lamp 45L, and the first light pattern P12 is formed by emitting light from the road surface drawing lamp 45R. Similarly to the first embodiment, the first light patterns P11 and P12 are drawn in first regions R11 and R12 located closest to the vehicle 1 and fourth regions R41 and R42 located far from the vehicle 1. The first light patterns P11 and P12 linearly extend toward the front of the vehicle 1.

The road surface drawing lamps 45L and 45R draw the second light pattern on the road surface, for example, about 0.1 seconds to 0.4 seconds after drawing the first light patterns P11 and P12 on the road surface. The second light pattern is formed by irradiating the first regions R11 and R12, second regions R21 and R22, and the fourth regions R41 and R42 with light.

The road surface drawing lamps 45L and 45R draw the third light pattern on the road surface, for example, about 0.1 seconds to 0.4 seconds after drawing the second light pattern on the road surface. The third light pattern is formed by irradiating the first regions R11 and R12, the second regions R21 and R22, third regions R31 and R32, and the fourth regions R41 and R42 with light. Then, the road surface drawing lamps 45L and 45R end the drawing of the sequential light pattern P, for example, about 0.1 seconds to 0.4 seconds after drawing the third light pattern on the road surface.

With the road surface drawing lamps 45L and 45R and the road surface drawing lamp system 400 having the above configuration, the same effects as those of the first embodiment can be exerted.

With the road surface drawing lamps 45L and 45R and the road surface drawing lamp system 400 having the above configuration, the first light patterns P11 and P12 extending linearly toward the front of the vehicle 1 are drawn on the road surface in front of the vehicle 1. Therefore, the pedestrian H around the vehicle 1 can recognize, at an early stage, the sequential light pattern P and a fact that the vehicle 1 around the pedestrian H is about to start in the front direction.

Sixth Embodiment

Figure 11:
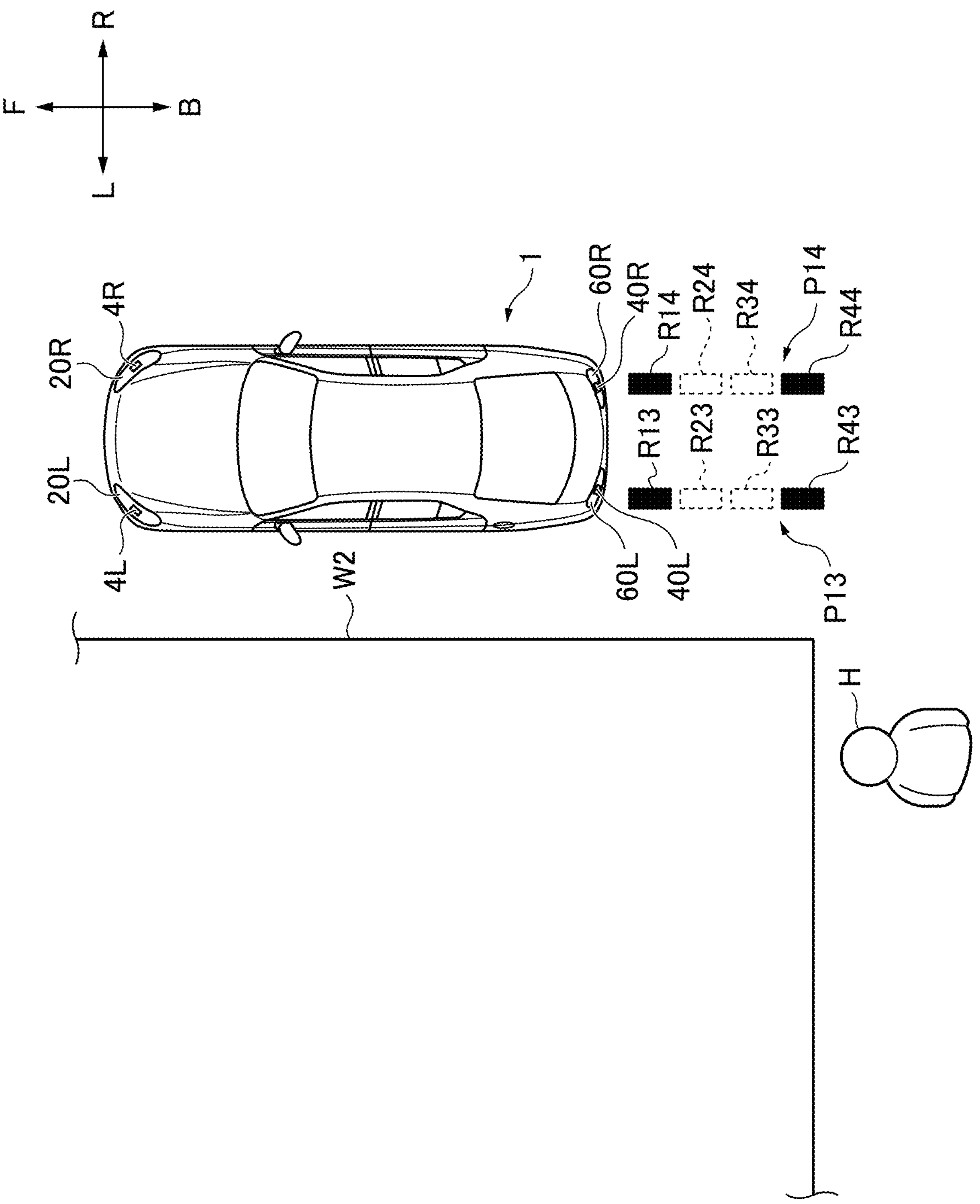
FIG. 11 is a diagram illustrating a state where a first light pattern is drawn on a road surface in a sixth embodiment.

Next, a sixth embodiment will be described with reference to FIG. 11. FIG. 11 is a diagram illustrating a state where the first light patterns P13 and P14 are drawn on the road surface in the sixth embodiment. In the present embodiment, the same components as those in the first embodiment are denoted by the same reference numerals, and the overlapping description will be appropriately omitted. In the present embodiment, the vehicle control unit 3 determines a backward movement of the vehicle 1 based on travel state information received from the sensor 5, and the vehicle control unit 3 determines the backward movement of the vehicle 1 in response to a driver operating a reverse range. In the present embodiment, the road surface drawing lamp unit 40L will be described as being disposed in a housing of the left rear combination lamp 60L of the vehicle 1, and the road surface drawing lamp unit 40R will be described as being disposed in a housing of the right rear combination lamp 60R of the vehicle 1. In the present embodiment, the road surface drawing lamp units 40L and 40R is provided with a swivel mechanism (not illustrated) capable of changing orientation of an optical axis by rotating road surface drawing lamps provided in the road surface drawing lamp units 40L and 40R in a desired direction. Further, in the present embodiment, the sequential light pattern P includes the first light patterns P13 and P14, a second light pattern to be described later, and a third light pattern to be described later.

Before the backward movement of the vehicle 1 is determined, the sequential light pattern P is not drawn on the road surface around the vehicle 1. When the backward movement of the vehicle 1 is determined, the lamp control unit 46L controls driving of the road surface drawing lamps of the road surface drawing lamp unit 40L and the road surface drawing lamp unit 40R so that the sequential light pattern P is drawn on the road surface, according to the same principle as in the first embodiment. When the backward movement of the vehicle 1 is determined, at least one of the camera 6 and the radar 7 transmits surrounding environment information including obstacle information on a wall (an example of obstacle) W2 on a left side of the vehicle 1 to the lamp control units of the road surface drawing lamp unit 40L and the road surface drawing lamp unit 40R via the vehicle control unit 3. The lamp control units determine that the wall W2 is present on the left side of the vehicle 1, and set a drawing region in the vicinity of the wall W2 based on position information on a position of the wall W2. Then, the lamp control units control the swivel mechanism so that the sequential light pattern P is drawn in the set drawing region, and rotate the road surface drawing lamps of the road surface drawing lamp unit 40L and the road surface drawing lamp unit 40R.

As illustrated in FIG. 11, the first light patterns P13 and P14 are drawn on the road surface behind the vehicle 1. The first light pattern P13 is formed by emitting light from the road surface drawing lamp included in the road surface drawing lamp unit 40L. The first light pattern P14 is formed by emitting light from the road surface drawing lamp included in the road surface drawing lamp unit 40R. Similarly to the first embodiment, the first light patterns P13 and P14 are drawn in the first regions R13 and R14 located closest to the vehicle 1 and the fourth regions R43 and R44 located far from the vehicle 1, respectively. The first light patterns P13 and P14 linearly extend toward the rear of the vehicle 1.

The road surface drawing lamps included in the road surface drawing lamp unit 40L and the road surface drawing lamp unit 40R draw the second light pattern on the road surface, for example, about 0.1 seconds to 0.4 seconds after drawing the first light patterns P13 and P14 on the road surface. The second light pattern is formed by irradiating the first regions R13 and R14, the second regions R23 and R24, and the fourth regions R43 and R44 with light.

The road surface drawing lamps included in the road surface drawing lamp unit 40L and the road surface drawing lamp unit 40R draw the third light pattern on the road surface, for example, about 0.1 seconds to 0.4 seconds after drawing the second light pattern on the road surface. The third light pattern is formed by irradiating the first regions R13 and R14, the second regions R23 and R24, the third regions R33 and R34, and the fourth regions R43 and R44 with light. Then, the road surface drawing lamps 45L and 45R end the drawing of the sequential light pattern P, for example, about 0.1 seconds to 0.4 seconds after drawing the third light pattern on the road surface.

With the road surface drawing lamp and the road surface drawing lamp system having the above configuration, the same effects as those of the first embodiment can be exerted.

With the road surface drawing lamp and the road surface drawing lamp system having the above configuration, the first light patterns P13 and P14 extending linearly toward the rear of the vehicle 1 are drawn on the road surface behind the vehicle 1. Therefore, the pedestrian H around the vehicle 1 can recognize, at an early stage, the sequential light pattern P and a fact that the vehicle 1 around the pedestrian H attempts to move backward in the back direction.

Although the embodiments of the present disclosure have been described above, it is needless to say that the technical scope of the present disclosure should not be limited to the description of the present embodiment. The present embodiment is merely an embodiment, and it will be obvious to those skilled in the art that various embodiments can be changed within the scope of the disclosure described in the claims. The technical scope of the present disclosure is determined based on the scope of the disclosure described in the claims and the equivalent scope thereof.

In the above embodiments, the road surface drawing lamp 45L includes the projection lens 455, but may include a reflector instead of the projection lens 455.

In the above embodiments, the first light patterns P1 and P10 to P14 are formed by irradiating the first regions R1 and R11 to R14 and the fourth regions R4 and R41 to R44 with light, but may be formed by irradiating only the fourth regions R4 and R41 to R44 with light. In this case, after drawing the first light patterns P1 and P10 to P14, for example, light patterns are drawn on the road surface in the order of a second light pattern formed by irradiating the first regions R1 and R11 to R14 and the fourth regions R4 and R41 to R44 with light, a third light pattern formed by irradiating the first regions R1 and R11 to R14, the second regions R2 and R21 to R24 and the fourth regions R4 and R41 to R44 with light, and a fourth light pattern formed by irradiating the first regions R1 and R11 to R14, the second regions R2 and R21 to R24, the third regions R3 and R31 to R34 and the fourth regions R4 and R41 to R44 with light. For example, the first light patterns P1 and P10 to P14 may be formed by irradiating an outer frame of the drawing region R including the tip portion R40 with light.

In the above embodiments, while the sequential light pattern P is drawn on the road surface, the fourth region R4 is normally irradiated with light, but the fourth region R4 may be irradiated with light only at the time of starting the drawing of the sequential light pattern P and at the time of ending the drawing.

In the above embodiments, the pedestrian H is exemplified as the traffic participant, but the traffic participant is not limited to the pedestrian H. The traffic participant may be, for example, another vehicle which is a vehicle different from the vehicle 1.

In the third embodiment, the light pattern drawn in the fourth region R4 includes the vehicle type information, but may also include scheduled travel information, speed information, and the like. For example, when the light pattern drawn in the fourth region R4 includes speed information and a speed of the vehicle 1 is 40 km/h, a shape of the light pattern drawn in the fourth region R4 is a shape corresponding to a character of 40 km/h.

In the third embodiment, the road surface drawing lamp 45L draws the second light pattern P2 not including vehicle information on the road surface after drawing the first light pattern P10 on the road surface, but may draw a second light pattern including the vehicle information. In the third embodiment, the road surface drawing lamp 45L draws the third light pattern P3 not including vehicle information on the road surface after drawing the second light pattern P2 on the road surface, but may draw a third light pattern including the vehicle information. In this case, a light pattern including the vehicle information included in the second light pattern and/or the third light pattern is drawn in the fourth region R4, that is, in the vicinity of the tip portion R40.

As described above, the following matters are disclosed in the present description.

(1) A road surface drawing lamp configured to be mounted on a vehicle, in which: the road surface drawing lamp is configured to draw a sequential light pattern in which an irradiation region changes in a sequential manner in a drawing region set in a surrounding region of the vehicle; and the road surface drawing lamp is configured to first form, as the sequential light pattern, a first light pattern which is drawn at least in a part including a tip portion of the drawing region.

(2) The road surface drawing lamp according to (1), in which: the drawing region includes, at least, a nearest region which is a region closest to the vehicle and a farthest region which is a region farthest from the vehicle; and the first light pattern is drawn in at least the farthest region.

(3) The road surface drawing lamp according to (1) or (2), in which the road surface drawing lamp is configured to draw the sequential light pattern in the drawing region in response to a signal indicating a change in a travel state being acquired from the vehicle.

(4) The road surface drawing lamp according to any of (1) to (3), in which: the sequential light pattern includes vehicle information on the vehicle; and the road surface drawing lamp is configured to draw the vehicle information in a vicinity of the tip portion.

(5) The road surface drawing lamp according to any of (1) to (4), in which the road surface drawing lamp is configured to draw; after drawing the first light pattern, the sequential light pattern such that illuminance thereof gradually decreases.

(6) The road surface drawing lamp according to any of (1) to (5), in which the tip portion of the drawing region exists in a range of 2 m or more and 10 m or less from the vehicle.

(7) A road surface drawing lamp system including: the road surface drawing lamp according to any of (1) to (6); a lamp control unit configured to control the road surface drawing lamp; and a detection unit configured to detect obstacle information on an obstacle that is present around the vehicle and limits a view angle of the vehicle, in which: the detection unit is configured to transmit the obstacle information to the lamp control unit in response to the obstacle being detected; and the lamp control unit is configured to control the road surface drawing lamp such that the sequential light pattern is drawn based on the obstacle information.

The invention claimed is:

1. A road surface light drawing method, comprising:

drawing a light pattern on a road surface by a drawing lamp configured to be mounted on a vehicle;

wherein an irradiation region of the light pattern changes in a drawing region set in a surrounding region of the vehicle, the drawing region including a farthest region provided at part including a tip portion of the drawing region farthest from the vehicle, a nearest region closest to the vehicle, and one or more intermediate regions between the farthest region and the nearest region, the farthest region being irradiated by a third light source, the nearest region being irradiated by a first light source, and the one or more intermediate regions being irradiated by a second light source, wherein a first light pattern, in which far light is drawn at least in the farthest region by the third light source and near light is drawn at least in the nearest region by the first light source but no intermediate light is drawn in the one or more intermediate regions by the second light source, is formed first as the light pattern, and;

wherein a second light pattern, in which the near light is drawn at least in the nearest region by the first light source, intermediate light is drawn in at least one of the one or more intermediate regions by the second light source, and the far light is drawn in the farthest region by the third light source, is second formed as the light pattern, wherein the far light drawn by the third light source is maintained in at least the farthest region during the entire light pattern, and wherein the near light drawn in the nearest region, the intermediate light drawn in the one or more intermediate regions, and the far light drawn in the farthest region extend in a line from the vehicle to the tip portion.

2. The road surface light drawing method according to claim 1, wherein the light pattern is drawn in the drawing region in response to a signal indicating a change in a travel state being acquired from the vehicle.

3. The road surface light drawing lamp method according to claim 1, wherein the light pattern includes vehicle information on the vehicle, and wherein the vehicle information is drawn in a vicinity of the tip portion.

4. The road surface light drawing lamp method according to claim 1, wherein after drawing the first light pattern, the light pattern is such that an illuminance thereof gradually decreases.

5. The road surface light drawing according to claim 1, wherein the tip portion of the drawing region exists in a range of 2 m or more and 10 m or less from the vehicle.

6. The road surface light drawing method according to claim 1; further comprising controlling the road surface drawing lamp by a lamp control unit; and detecting obstacle information on an obstacle that is present around the vehicle and limits a view angle of the vehicle, transmitting the obstacle information to the lamp control unit in response to the obstacle being detected, and controlling the road surface drawing lamp such that the light pattern is drawn based on the obstacle information.

* * * * *